UNITED STATES PATENT OFFICE.

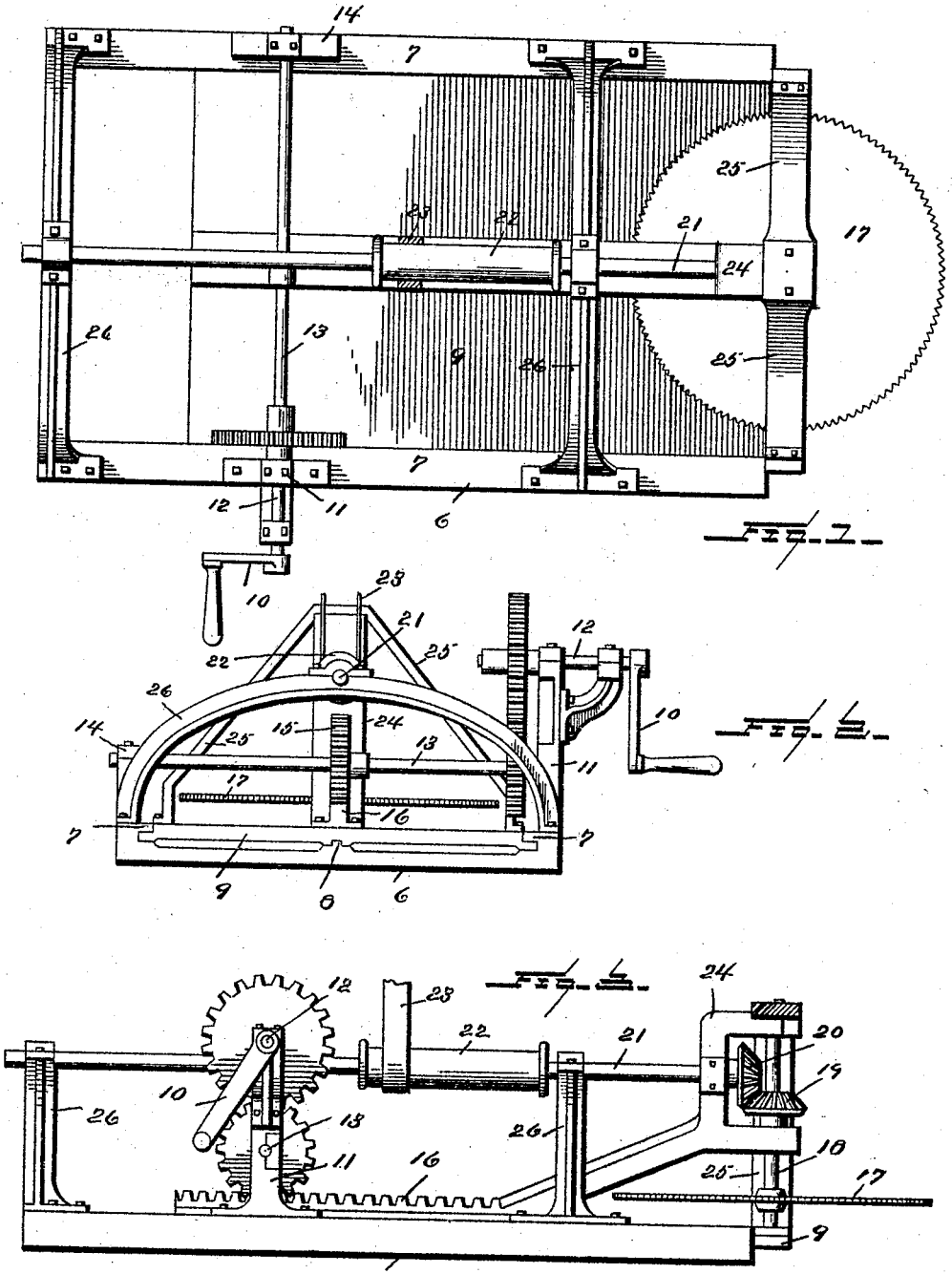

FRANK A. BONEN, OF BEAMAN, MISSOURI.

PORTABLE SAW.

No. 800,202.  Specification of Letters Patent.  Patented Sept. 26, 1905.

Application filed May 8, 1905. Serial No. 259,451.

*To all whom it may concern:*

Be it known that I, FRANK A. BONEN, a citizen of the United States, residing at Beaman, in the county of Pettis and State of Missouri, have invented new and useful Improvements in Portable Saws, of which the following is a specification.

This invention is a portable saw designed particularly for felling trees.

The particular object of the invention is to form an improved saw capable of sawing trees close to the ground, so as to leave a very short stump which agricultural implements can travel over instead of having to go around.

A further object of the invention is to provide improved means for supporting, driving, and feeding a circular saw for the purpose stated.

In the accompanying drawings, Figure 1 is a top plan view of the machine. Fig. 2 is a rear end elevation. Fig. 3 is a side elevation.

Referring specifically to the drawings, 6 indicates a bed which sets on the ground. This bed has at the side edges overhanging guides 7 and at the middle a rib-guide 8.

9 is a carriage which slides in said guides, the carriages being tongued and grooved to fit the guides.

10 indicates a crank the shaft 12 of which is mounted in bearings on a suitable standard 11 at one side of the machine. This shaft is geared to a shaft 13, which extends horizontally across above the carriage, being mounted at one end in bearings in the standard 11 and at the other end in bearings upon a standard 14. These standards are supported upon the bed 6. The shaft 13 carries a pinion 15, which meshes with the rack 16, extending lengthwise along the carriage 9 at the middle line thereof. By means of this construction and gearing the carriage 9 is moved back and forth upon the bed to feed the saw into the tree and back.

The circular saw 17 is mounted upon a vertical spindle 18 at the front of the carriage, and the spindle is geared by bevel-gears 19 and 20 to a shaft 21, bearing a wide pulley 22, to which a suitable driving-belt may be applied, as indicated at 23. The spindle 18 and the front end of the shaft 21 are mounted in bearings in a forked bracket 24, which may conveniently be made a continuation of or integral casting with the rack 16. This bracket is braced by inclined braces 25 on each side extending from the carriage 9 to the top of the bracket and spread a sufficient distance out of the way of the saw. The shaft 21 is also mounted in bearing-boxes upon standards 26, mounted upon the bed 6, the shaft being slidable lengthwise in said bearings.

In operation the saw is retracted and the machine is set on the ground close to the tree to be felled. The saw is driven by the belt 23 through the intermediate gearing. As the saw cuts into the tree it is advanced by turning the crank 10, which advances the carriage 9, and with it the saw and its gearing. The long pulley 22 allows the advance without throwing the belt off. The carriage being located so close to the ground enables the saw to cut a stump but a few inches high, which will be found very advantageous in subsequent tillage, because agricultural implements can then be driven directly over the same, avoiding the destruction of crops incident to going around. The bracket and braces afford a rigid support for the saw-arbor, and the advance of the saw, as will be seen, is always under the control of the operator.

What I claim as new, and desire to secure by Letters Patent, is—

1. The combination with the sliding carriage having fixed thereupon a rack terminating at its front end in an upwardly-inclined bearing-bracket, and a saw mounted upon the front end of the carriage and extending under the bracket and having its arbor mounted in bearings in the bracket.

2. The combination of the carriage, the overhanging bracket having bearings at its upper end, braces extending laterally from said end to the carriage, and the saw located horizontally under the bracket and braces and having its arbor supported in said bearings.

In testimony whereof I have signed my name to this specification in the presence of two subscribing witnesses.

FRANK A. BONEN.

Witnesses:
CALEB H. MOCK,
P. H. SANGREE.